(12) United States Patent
Mervin

(10) Patent No.: X9212
(45) Date of Patent: Oct. 28, 1835

(54) SAW TEETH, CUTTING

(76) Inventor: Andrew T. Mervin

Andrew F. Mervin, Muncy. Pa.

Letters Patent.

The Schedule referred to in these Letters Patent and making
part of the same, containing a description in the words of the said
Andrew F. Mervin, himself of his improvement in the Machine
for cutting saw teeth and Punching.

Be it known that I Andrew F. Mervin of the Borough of Muncy.
Lycoming Co, State of Pennsylvania have made an improve=
ment in the Machine for cutting Saw-teeth, which is described
as follows – The bed to receive the different parts of the apparatus
for cutting saw-teeth – the stock to receive the dies. the levers used
for working the cutters are somewhat similar to those already
in use. My improvements consists in having moveable dies: the
plate and screw for securing the female die; The screws & plate
for regulating the stock containing the dies. the regulator for de=
termining the size and shape of the teeth – the moveable dies are
made of steel or cast iron, they are made in the shape of the tooth
required, & have dove-tail shanks for securing them in the stock.
A piece of sheet lead is also used for making them firm & steady:
The plate for holding down the female die is made of cast iron
extending to the front of the female die and is made fast by a nut
and screw on the top of the bed or frame – The screws & plate for
regulating the stock containing the male dies are let in through
the side of the bed or frame and press against a moveable plate
which presses against the stock containing the male dies and are
for the purpose of making the dies cut true – There is also a screw
working through a bar on the top, pressing on the stock and for
keeping it steady. – The regulator for determining the size and
shape is made of a piece of iron having a screw-bolt for securing
it fast in a slat or opening in the bed made for that purpose.

This this slot will be made sufficiently long to admit the teeth of a circular saw to be cut in the same manner as those of long thin saws- the bed with the whole apparatus can be made fast to a bench or other stand by means of a dog & a hand screw- Operation. the male die of the shape of the tooth required is fasten=ed in the stock and the female die fastened down by the plate & screw the saw plate is set in front of the female die on its edge, the lever which works the stock and male die is then brought down, this forces the male die through the plate of the saw into the female die and the tooth is thus cut- pieces cut out being forced forward- the invention here claimed and desired to to be secured by Letters Patent consists in the before described moveable dies the plate for holding down the female die- the screws and plate for regulating the stock- the regulator for determining the size & shape of the tooth, with the arrangement and adaptation of the several parts of the Machine for cutting & gumming saws right & left and for punching.

Tested Witnesses
W. C. Fleet Smith
J. A. Elliott

Andrew [illegible] Mervine

[630 Words]